United States Patent
Ichikawa et al.

(10) Patent No.: US 6,943,212 B2
(45) Date of Patent: Sep. 13, 2005

(54) DEPROTEINIZED NATURAL RUBBER LATEX, METHOD OF PREPARING THE SAME, RUBBER PRODUCT USING THE SAME, AND PROTEOLYTIC AGENT FOR DEPROTEINIZED NATURAL RUBBER LATEX

(75) Inventors: Naoya Ichikawa, Kobe (JP); Yoshiaki Miyamoto, Kobe (JP)

(73) Assignees: Sumitomo Rubber Industries, Ltd., Hyogo (JP); Kao Corporation, Tokyo (JP)

( * ) Notice: Subject to any disclaimer, the term of this patent is extended or adjusted under 35 U.S.C. 154(b) by 127 days.

(21) Appl. No.: 10/082,243

(22) Filed: Feb. 26, 2002

(65) Prior Publication Data

US 2002/0161084 A1 Oct. 31, 2002

(30) Foreign Application Priority Data

Feb. 26, 2001 (JP) .......................................... 2001-051129
Feb. 26, 2001 (JP) .......................................... 2001-051130

(51) Int. Cl.$^7$ ................................................ C08K 3/04
(52) U.S. Cl. .................... 524/575.5; 524/127; 524/158; 524/157; 524/161
(58) Field of Search ............................ 524/575.5, 127, 524/158, 157, 161

(56) References Cited

U.S. PATENT DOCUMENTS 5,610,212 A * 3/1997 Tanaka et al. ............... 524/156
5,910,567 A * 6/1999 Tanaka et al. ............... 528/491
6,239,253 B1 * 5/2001 Tanaka et al. ............... 528/494

FOREIGN PATENT DOCUMENTS

| EP | 0 584 597 A1 | 3/1994 |
| EP | 0 630 907 A1 | 12/1994 |
| EP | 0 816 417 A1 | 1/1998 |
| JP | 2905005 | 3/1999 |
| JP | 2000-17002 | 1/2000 |

OTHER PUBLICATIONS

X. Baur et al., Protein and Allergen Content of Various Natural Latex Articles, Allergy 1997, pp. 661–664.

* cited by examiner

Primary Examiner—Peter D. Mulcahy
(74) Attorney, Agent, or Firm—Birch, Stewart, Kolasch & Birch, LLP.

(57) ABSTRACT

The present invention provides a deproteinized natural rubber latex wherein coagulation of a rubber component does not occur when the concentration of calcium ions ($Ca^{2+}$) is 0.01 mol/L or less and coagulation of the rubber component occurs when the concentration of $Ca^{2+}$ is 0.1 mol/L or more; a method of preparing the deproteinized natural rubber latex, which comprises adding a protease and two or more surfactants having different coagulation properties to calcium ions ($Ca^{2+}$) to a natural rubber latex and maturing the natural rubber latex; a rubber product using the deproteinized natural rubber latex; and a proteolytic agent comprising a protease and two or more surfactants. The deproteinized natural rubber latex is a latex wherein rubber molecules are dispersed and stabilized by a surfactant, and also have good film forming properties by means of the anode coagulation method and is less likely to cause uneven thickness of the film and liquid dripping even when a mold is dipped repeatedly in a latex on formation of a rubber film.

8 Claims, No Drawings

DEPROTEINIZED NATURAL RUBBER LATEX, METHOD OF PREPARING THE SAME, RUBBER PRODUCT USING THE SAME, AND PROTEOLYTIC AGENT FOR DEPROTEINIZED NATURAL RUBBER LATEX

BACKGROUND OF THE INVENTION

The present invention relates to a deproteinized natural rubber latex, which is superior in balance between the film forming properties by means of the anode coagulation method and the dispersion stability of a latex, a method of preparing the same, a rubber product using the deproteinized natural rubber latex, and a proteolytic agent for natural rubber latex.

Natural rubbers have widely been used in various fields, for example, rubber gloves because of features such as large extension, high elasticity and strong film strength.

In the production of a glove made of a natural rubber, a production method is employed according to the thickness of a rubber film. A rubber glove having a film thickness of about 1 mm, for example, glove for home use is generally produced by a so-called anode coagulation method of dipping a mold (hand mold) for glove, the surface of which is previously coated with a coagulant (anode coagulant), in a natural rubber latex.

It has recently been required for a rubber product using a natural rubber latex to highly remove a protein contained in the product. Main reasons include (1) immediate (I type) allergy such as dyspnea or urticaria is caused by bringing a natural rubber product into contact with the skin or mucosa and a protein contained in a natural rubber latex is considered to be a causative agent; (2) the protein can cause variations in quality and vulcanization properties of the natural rubber product because the kind and quantity of the protein vary depending on the locality and production season of the latex; and (3) the protein can cause deterioration of mechanical characteristics such as creep characteristics and aging resistance and electrical characteristics such as insulating properties of the rubber product.

Japanese Published Unexamined Patent (Kokai Tokkyo Koho Hei) No. 6-56902 discloses a method of removing a protein and a decomposition product thereof through a series of the steps of adding a proteolytic enzyme (protease) and a surfactant to a natural rubber latex, maturing the natural rubber latex, thereby decomposing a protein in the latex, and subjecting the latex to a centrifugation treatment. When subjected to a deproteinization treatment according to this method, the protein in the natural rubber latex can be removed in a very high level and the nitrogen content (N %) as measured by the Kjeldahl method is reduced to 0.1% by weight or less.

For the purpose of preventing coagulation of a rubber component caused by an operation such as stirring by stabilizing a latex unstabilized as a result of removal of a protein, a surfactant is incorporated into a so-called deproteinized natural rubber latex obtained by the method disclosed in the publication described above.

The surfactant not only improves the mechanical stability of the latex, but also exerts a large influence on the sensitivity to an anode coagulant. When using a higher alcohol sulfate ester salt anionic surfactant as the surfactant, the sensitivity of the latex to the anode coagulant increases. Therefore, a film can be formed by the anode coagulation method even under the same conditions as those in case of the non-deproteinized natural rubber latex.

However, because of too large sensitivity to the anode coagulant, the film is rapidly dried after dipping in the latex as compared with the case of using the natural rubber latex. As a result, when a mold is repeatedly dipped in the latex for the purpose of increasing the thickness of rubber film, there arise new problems such as uneven thickness of the rubber and liquid dripping.

When using a higher alkyl phenyl ether sulfate ester salt anionic surfactant as the surfactant, the sensitivity of the latex to the anode coagulant decreases and the rubber component is less likely to be coagulated. To form a film having nearly the same thickness as that in case of the non-deproteinized natural rubber by the anode coagulation method, there arise new problems that very special film forming conditions or a very complicated step are required.

The present applicants have previously found such a fact that a dip product having a sufficient film thickness can be obtained by using a specific heat sensitizer and a specific anode coagulant in a specific combination and incorporating the specific combination in a large amount as compared with a conventional formulation (Japanese Published Unexamined Patent (Kokai Tokkyo Koho) No. 2000-17002).

However, there were problems, according to the method described in the publication described above, since the both of the heat sensitizer and the anode coagulant are incorporated into the latex, the latex becomes unstable as compared with a conventional heat sensitizing method using a natural rubber latex, thereby making it impossible to obtain long-term stability and making it hard to control heat-sensitive properties.

SUMMARY OF THE INVENTION

Thus, an object of the present invention is to provide a deproteinized natural rubber latex, which is a latex whose rubber particles are dispersed and stabilized by a surfactant by means of a deproteinization treatment, and also which has good film forming properties by means of the anode coagulation method and is capable of producing a rubber product having a sufficient film thickness under the same film forming conditions as those of the prior art without causing uneven thickness of the film and liquid dripping even when a mold is dipped repeatedly in a latex on formation of a rubber film, and a method of preparing the same.

Another object of the present invention is to provide a dip product using the deproteinized natural rubber latex by means of the anode coagulation method.

A still another object of the present invention is to provide a proteolytic agent, which is capable of subjecting a natural rubber latex to a high-level proteolyzation or deproteinization treatment and can also impart sufficient coagulation properties by means of the anode coagulation method and good film forming properties without causing uneven thickness and liquid dripping to the proteolyzed natural rubber latex or deproteinized natural rubber latex obtained by the treatment, and also which can improve balance with the dispersion stability of the latex.

As described above, a conventional deproteinized natural rubber latex had such problems that too high sensitivity to the anode coagulant caused uneven thickness of the rubber film and liquid dripping in case of dipping repeatedly, or that too low sensitivity to the anode coagulant made it difficult to coagulate the rubber component.

However, the present inventors have studied intensively to solve the problems described above and found the following quite new fact. That is, even if the coagulation properties to calcium ions (hereinafter referred to as "$Ca^{2+}$")

of the deproteinized natural rubber latex are controlled and the latex is added dropwise in an aqueous solution having the concentration of $Ca^{2+}$ of 0.01 mol/L or less, coagulation of the rubber component in the latex does not occur. However, when the coagulation properties are controlled so that coagulation of the rubber component occurs when the latex is added dropwise in an aqueous solution having the concentration of $Ca^{2+}$ of 0.1 mol/L or more, the sensitivity to anode coagulants such as calcium nitrate, calcium chloride and the like becomes proper surprisingly, there by making it possible to markedly improve the film forming properties by means of the anode coagulation method and to afford good balance with the dispersion stability of the latex. Thus, the present invention has been completed.

The present invention is directed to:

(I) a deproteinized natural rubber latex which is obtained by subjecting to a treatment for decomposition and removal of a protein, wherein coagulation of a rubber component does not occur when the concentration of calcium ions ($Ca^{2+}$) is 0.01 mol/L or less and coagulation of the rubber component occurs when the concentration of $Ca^{2+}$ is 0.1 mol/L or more;

(II) a method of preparing a deproteinized natural rubber latex, which comprises adding a protease and two or more surfactant shaving different coagulation properties to calcium ions ($Ca^{2+}$) to a natural rubber latex, and maturing the natural rubber latex, wherein two or more surfactants are stably dispersed when the concentration of $Ca^{2+}$ of an aqueous solution (25° C.) containing the surfactants is 0.1 mol/L or less, and are coagulated when $Ca^{2+}$ of the aqueous solution is 1.0 mol/L or more;

(III) a rubber product using a deproteinized natural rubber latex, which is obtained by dipping a dipping mold, the surface of which is coated with an anode coagulant, in the deproteinized natural rubber latex containing a vulcanizing agent added therein described in the term (I), vulcanizing a rubber film formed on the surface of the dipping mold, and removing the rubber film from the dipping mold; and (IV) a proteolytic agent for natural rubber latex, comprising a protease and two or more surfactants having different coagulation properties to calcium ions ($Ca^{2+}$), wherein two or more surfactants are stably dispersed when the concentration of $Ca^{2+}$ of an aqueous solution (25° C.) containing the surfactants is 0.1 mol/L or less, and are coagulated when $Ca^{2+}$ of the aqueous solution is 1.0 mol/L or more.

DETAILED DESCRIPTION OF THE INVENTION

The present invention includes the respective inventions relating to the following deproteinized natural rubber latex, the method of preparing the same, the rubber product using the same, and the proteolytic agent for deproteinized natural rubber latex.

(1) A deproteinized natural rubber latex which is obtained by subjecting to a treatment for decomposition and removal of a protein, wherein coagulation of a rubber component does not occur when the concentration of calcium ions ($Ca^{2+}$) is 0.01 mol/L or less and coagulation of the rubber component occurs when the concentration of calcium ions ($Ca^{2+}$) is 0.1 mol/L or more.

(2) The deproteinized natural rubber latex described in the term (1), wherein the treatment for decomposition of the protein is conducted by adding a protease and two or more surfactants having different coagulation properties to calcium ions ($Ca^{2+}$) to a natural rubber latex and maturing the natural rubber latex, and two or more surfactants are stably dispersed when the concentration of $Ca^{2+}$ of an aqueous solution (25° C.) containing the surfactants is 0.1 mol/L or less, and are coagulated when $Ca^{2+}$ of the aqueous solution is 1.0 mol/L or more.

(3) The deproteinized natural rubber latex described in the term (1), wherein the deproteinized natural rubber latex, which is obtained by subjecting to a treatment for decomposition and removal of a protein, is prepared by adding a protease to a natural rubber latex and maturing the natural rubber latex, centrifuging the latex, thereby to isolate a creamy rubber solid content, and dispersing the rubber solid content in an aqueous medium, wherein the aqueous medium contains two or more surfactants having different coagulation properties to calcium ions ($Ca^{2+}$) and enables the surfactants to stably disperse when a liquid temperature is 25° C. and the concentration of calcium ions ($Ca^{2+}$) is 0.1 mol/L or less, and to coagulate when the liquid temperature is 25° C. and the concentration of $Ca^{2+}$ is 1.0 mol/L or more.

(4) The deproteinized natural rubber latex described in the term (2) or (3), wherein two or more surfactants include:

at least one surfactant (sometimes referred to as "surfactant H") selected from the group consisting of carboxylic acid anionic surfactant, higher alcohol sulfate ester salt anionic surfactant, sulfonic acid anionic surfactant and phosphoric acid anionic surfactant, and at least one surfactant (sometimes referred to as "surfactant L") selected from the group consisting of higher alkylphenyl ether sulfate ester salt anionic surfactant and higher alkyl ether sulfate ester salt anionic surfactant.

(5) The deproteinized natural rubber latex described in the term (2), wherein the total amount of two or more surfactants added on treatment for decomposition of a protein is within a range from 0.01 to 10 parts by weight based on 100 parts by weight of the rubber solid content of the natural rubber latex.

(6) The deproteinized natural rubber latex described in the term (3), wherein the total content of two or more surfactants in the aqueous dispersion medium is within a range from 0.01 to 10 parts by weight based on 100 parts by weight of the solid content dispersed in the aqueous dispersion medium.

(7) A method of preparing a deproteinized natural rubber latex, which comprises adding a protease and two or more surfactants having different coagulation properties to calcium ions ($Ca^{2+}$) to a natural rubber latex, and maturing the natural rubber latex, wherein two or more surfactants are stably dispersed when the concentration of $Ca^{2+}$ of an aqueous solution (25° C.) containing the surfactants is 0.1 mol/L or less, and are coagulated when $Ca^{2+}$ of the aqueous solution is 1.0 mol/L or more.

(8) A method of preparing a natural rubber latex, which comprises subjecting a natural rubber latex to a treatment for decomposition of a protein due to a protease and a treatment for removal of a protein due to centrifugation, and dispersing the resulting creamy rubber solid content in an aqueous medium, wherein the aqueous medium contains two or more surfactants having different coagulation properties to calcium ions ($Ca^{2+}$), and enables the surfactants to stably disperse when a liquid temperature is 25° C. and the concentration of $Ca^{2+}$ is 0.1 mol/L or less, and to coagulate when the liquid temperature is 25° C. and the concentration of $Ca^{2+}$ is 1.0 mol/L or more.

(9) A rubber product using a deproteinized natural rubber latex, which is obtained by dipping a dipping mold, the surface of which is coated with an anode coagulant, in the deproteinized natural rubber latex containing a vulcanizing agent added therein described in any one of terms (1) to (6), vulcanizing a rubber film formed on the surface of the dipping mold, and removing the rubber film from the dipping mold.

(10) A proteolytic agent for natural rubber latex, comprising a protease and two or more surfactant shaving different coagulation properties to calcium ions ($Ca^{2+}$), wherein two or more surfactants are stably dispersed when the concentration of $Ca^{2+}$ of an aqueous solution (25° C.) containing the surfactants is 0.1 mol/L or less, and are coagulated when $Ca^{2+}$ of the aqueous solution is 1.0 mol/L or more.

(11) The proteolytic agent for natural rubber latex described in the term (10), wherein two or more surfactants include:

at least one surfactant H selected from the group consisting of carboxylic acid anionic surfactant, higher alcohol sulfate ester salt anionic surfactant, sulfonic acid anionic surfactant and phosphoric acid anionic surfactant, and at least one surfactant L selected from the group consisting of higher alkyl phenyl ether sulfate ester salt anionic surfactant and higher alkyl ether sulfate ester salt anionic surfactant.

(12) The proteolytic agent for natural rubber latex described in the term (11), wherein a ratio of the content of the surfactant H to the surfactant L is within a range from 15:85 to 70:30 by weight ratio.

According to the invention (1), it is made possible to produce a rubber product having a sufficient film thickness under the same conditions as those in case of forming a film from a non-deproteinized natural rubber latex by means of the anode coagulation method without causing uneven thickness of the rubber film and liquid dripping when a mold is repeatedly dipped.

In case of the deproteinized natural rubber latex described in Japanese Published Unexamined Patent (Kokai Tokkyo Koho) No. 2000-17002, there arises a problem that long-term stability of the latex is impaired by incorporating the both of the heat sensitizer and the anode coagulant in the amount larger than that in case of a conventional formulation as described above. However, according to the deproteinized natural rubber latex of the present invention, such a problem is not likely to arise.

As used herein, the expression "coagulation of the rubber occurs" refers to the fact that the rubber component in the deproteinized natural rubber latex is completed isolated in the upper layer of the latex in the form of a coherent solid content (in such a case, an aqueous solution containing $Ca^{2+}$ becomes transparent) or the fact that the coherent solid content is partially observed in the deproteinized natural rubber latex (in such a case, the aqueous solution containing $Ca^{2+}$ is still in the state of white turbidity).

As used herein, the expression "coagulation of the rubber does not occur" refers to the fact that the rubber component in the deproteinized natural rubber latex is maintained in the dispersed and suspended state and the coherent rubber solid content is not observed in the latex (in such a case, the aqueous solution containing $Ca^{2+}$ is still in the state of white turbidity).

The presence or absence of "coagulation of the rubber component" is judged whether or not the rubber component in a deproteinized natural rubber latex is observed in the form of a coherent solid content after adding dropwise the latex in an aqueous solution wherein the concentration of $Ca^{2+}$ is controlled to a predetermined value. In case "coagulation of the rubber component does not occur", the rubber component is rapidly dispersed in the aqueous solution containing $Ca^{2+}$ when the latex is added dropwise.

Regarding the natural rubber latex used to evaluate the coagulation properties to $Ca^{2+}$, the concentration of the rubber solid content is not specifically limited. However, since it becomes difficult to judge coagulation of the rubber component when the concentration of the rubber solid content is too low, the concentration of the solid rubber content of the latex is preferably set within a range from about 30 to 60% by weight beforehand. The liquid temperature of the aqueous solution having a predetermined concentration of $Ca^{2+}$ used to evaluate the coagulation properties to $Ca^{2+}$ of the latex is not specifically limited, but is preferably set to a fixed temperature of about 25° C. In the present invention, those prepared by controlling the concentration of the rubber solid content to 60% by weight were used as the latex in case of evaluating the coagulation properties to $Ca^{2+}$ and the liquid temperature of the aqueous solution having a predetermined concentration of $Ca^{2+}$ was set to 25° C., unless otherwise specified.

The deproteinized natural rubber latex of the invention (1) can be prepared by stabilizing the latex using a combination of two or more surfactants having different coagulation properties to $Ca^{2+}$. The coagulation properties to the $Ca^{2+}$ of the deproteinized natural rubber latex is set within a predetermined range by the combination of these surfactants.

More specifically, the deproteinized natural rubber latex of the present invention (1) can be prepared by the process (i) of subjecting a natural rubber latex to a deproteinization treatment using two or more surfactants having different coagulation properties to $Ca^{2+}$ and a protease, or the process (ii) of dispersing a natural rubber subjected previously to a deproteinization treatment by various conventionally known methods in an aqueous dispersion medium wherein the coagulation properties to $Ca^{2+}$ are set within a predetermined range.

In the deproteinized natural rubber latex of the present invention, two or more surfactants having different coagulation properties (dispersion stability) to $Ca^{2+}$ are used for the purpose of maintaining the dispersed state of the rubber component unstabilized as a result of the deproteinization treatment.

In case the coagulation properties to the concentration of $Ca^{2+}$ of the latex are set within the above range using a combination of a surfactant having relatively high coagulation properties (low dispersibility) to $Ca^{2+}$ and a surfactant having relatively low coagulation properties (high dispersibility) to $Ca^{2+}$, the stably-dispersed state of the rubber component can be maintained without causing coagulation of the rubber component in the latex at the stage before film formation by means of the anode coagulation method. Specific examples of the stage before film formation by means of the anode coagulation method include storage of the deproteinized natural rubber latex for a long period of time, application of mechanical vibration to the latex during conveying, and addition of various additives such as vulcanizing agent to the latex.

When the deproteinized natural rubber latex of the present invention is brought into contact with an anode coagulant having the concentration used conventionally in the anode coagulation method, coagulation occurs in the surfactant having higher coagulation properties to $Ca^{2+}$ between two surfactants and the dispersibility of the rubber in the latex is drastically lowered. Therefore, it is made possible to form a rubber film by means of the anode coagulation method.

As used herein, the expression "two or more surfactants are coagulated" refers to the fact that at least one of two surfactants is bonded with $Ca^{2+}$ to form a salt insoluble in water. As used herein, the expression "two or more surfactants are stably dispersed" refers to the fact that the dispersibility of the surfactants in the aqueous solution is maintained without forming a salt as a result of bonding with $Ca^{2+}$.

As used herein, the term "aqueous dispersion medium" mainly refers to water. As far as the dispersion stability of the latex are not adversely affected, the aqueous dispersion medium include those which contain other solvents miscible with water (for example, organic solvent) and additives incorporated conventionally in the latex used in film formation by means of the anode coagulation method.

The coagulation properties to $Ca^{2+}$ of the surfactant can be set within the above range by using those belonging to the surfactant H in combination with those belonging to the surfactant L as two or more surfactants in the inventions (2) and (3).

Balance between the film forming properties by means of the anode coagulation method and the dispersion stability with respect to the deproteinized natural rubber latex can be further improved by setting the total amount or total content of two or more surfactants to the above range in the inventions (5) and (6).

According to the inventions (7) and (8), it is made possible to prepare a deproteinized natural rubber latex wherein coagulation of a rubber component does not occur when the concentration of calcium ions ($Ca^{2+}$) is 0.01 mol/L or less and coagulation of the rubber component occurs when the concentration of $Ca^{2+}$ is 0.1 mol/L or more.

The method of preparing the deproteinized natural rubber latex of the invention (7) is one aspect of the method of preparing the deproteinized natural rubber latex according to the invention (2). The method of preparing the deproteinized natural rubber latex of the invention (8) is one aspect of the method of preparing the deproteinized natural rubber latex according to the invention (3).

In the methods of preparing the deproteinized natural rubber latex according to the inventions (7) and (8), as two or more surfactants, those including at least one surfactant H selected from the group consisting of carboxylic acid anionic surfactant, higher alcohol sulfate ester salt anionic surfactant, sulfonic acid anionic surfactant and phosphoric acid anionic surfactant, and at least one surfactant L selected from the group consisting of higher alkyl phenyl ether sulfate ester salt anionic surfactant and higher alkyl ether sulfate ester salt anionic surfactant are preferably used.

In the invention (7), the total amount of two or more surfactants added on treatment for decomposition of a protein is preferably within a range from 0.01 to 10 parts by weight based on 100 parts by weight of the rubber solid content of the natural rubber latex. In the invention (8), the total content of two or more surfactants in the aqueous dispersion medium is preferably within a range from 0.01 to 10 parts by weight based on 100 parts by weight of the rubber solid content dispersed in the aqueous dispersion medium.

In such a case, balance between the film forming properties by means of the anode coagulation method and the dispersion stability of a latex can be further improved.

The rubber product of the invention (9) is produced by adding a vulcanizing agent to the deproteinized natural rubber latex of the present invention, dipping a dipping mold, the surface of which is coated with an anode coagulant, in the deproteinized natural rubber latex, vulcanizing a rubber film formed on the surface of the dipping mold, and removing the rubber film from the dipping mold.

According to the rubber product using the deproteinized natural rubber latex of the invention (9) and the method of producing the same, it is made possible to produce a rubber product made of a deproteinized natural rubber latex, wherein a fear of the occurrence of immediate (I type) allergy has been markedly reduced by the deproteinization treatment, by using a non-deproteinized natural rubber latex under the same conditions. Accordingly, the invention (9) is suited for application to a rubber glove for home use having a thickness of about 1 mm.

As used herein, the term "rubber product" refers to a rubber product produced by the anode coagulation method and specific examples thereof include medical appliances (for example, catheter, double balloon, etc.), finger cots and toys, including rubber gloves.

In the rubber product using the deproteinized natural rubber latex of the present invention and the method of producing the same, examples of the anode coagulant include, but are not limited to, metal salts having an ionic value of 2 or more and organic alkylamine salts. Examples of the metal salt having an ionic value of 2 or more include calcium nitrate and calcium chloride. These anode coagulants are generally used in the form of an aqueous solution.

Regarding the proteolytic agents for deproteinized natural rubber latex of the inventions (11) to (12), the degree of the coagulation to $Ca^{2+}$ of the surfactant contained in the proteolytic agent is controlled within the above range, as described above. Therefore, in case the treatment for decomposition of a protein in the natural rubber latex is conducted using the proteolytic agent of the present invention, proper anode coagulation properties (in other words, excellent film forming properties by means of the anode coagulation method) can be imparted to the latex after subjecting to the treatment.

Regarding the proteolyzed natural rubber latex (or deproteinized natural rubber latex) obtained by such a treatment, the stably-dispersed state of the rubber component can be maintained without causing coagulation of the rubber component in the latex at the stage before film formation by means of the anode coagulation method. Specific examples of the stage before film formation by means of the anode coagulation method include storage of the deproteinized natural rubber latex for a long period of time, application of mechanical vibration to the latex during conveying, and addition of various additives such as vulcanizing agents to the latex.

When the proteolyzed natural rubber latex (or deproteinized natural rubber latex) of the present invention is brought into contact with an anode coagulant having the concentration used conventionally in the anode coagulation method, coagulation occurs in the surfactant having higher coagulation properties to $Ca^{2+}$ among two surfactants and the dispersibility of the rubber in the latex is drastically lowered. Therefore, it is made possible to form a rubber film by means of the anode coagulation method.

Since the proteolytic agent of the present invention can control the sensitivity to anode coagulants such as calcium nitrate and calcium chloride of the proteolyzed natural rubber latex (or deproteinized natural rubber latex) treated with the treating agent to proper sensitivity, the proteolytic agent of the present invention is suited to prepare a proteolyzed natural rubber latex (or deproteinized natural rubber latex) for film formation by means of the anode coagulation method.

In the proteolytic agent for natural rubber latex of the present invention, two or more surfactants are preferably those including at least one surfactant H selected from the group consisting of carboxylic acid anionic surfactant, higher alcohol sulfate ester salt anionic surfactant, sulfonic acid anionic surfactant and phosphoric acid anionic surfactant, and at least one surfactant L selected from the group consisting of higher alkyl phenyl ether sulfate ester salt anionic surfactant and higher alkyl ether sulfate ester salt anionic surfactant are preferably used.

The proteolytic agent for natural rubber latex of the present invention contains two or more surfactants having different coagulation properties (dispersion stability) to $Ca^{2+}$, the degree of coagulation to $Ca^{2+}$ being controlled within a predetermined range. As described above, when using those having relatively high coagulation properties (low dispersibility) to $Ca^{2+}$ in combination with those having relatively low coagulation properties (high dispersibility) to $Ca^{2+}$, the coagulation properties to $Ca^{2+}$ of the latex can be easily set within the range described above. Specific examples of the surfactant having relatively high coagulation properties to $Ca^{2+}$ include those included in the group of the surfactant H, while specific examples of the surfactant having relatively low coagulation properties to $Ca^{2+}$ include those included in the group of the surfactant L.

The coagulation properties to $Ca^{2+}$ with respect to two or more surfactants are usually evaluated by adding dropwise the surfactant in the form of an aqueous solution to an aqueous solution containing $Ca^{2+}$. In this case, the concentration of the aqueous surfactant is not specifically limited. However, since it becomes difficult to judge the presence or absence of coagulation of the rubber component when the concentration is too low, it is preferred to previously set the concentration of the aqueous solution of two or more surfactants (mixture) to about 10% by weight. The liquid temperature of the aqueous solution having a predetermined concentration of $Ca^{2+}$ used to evaluate the coagulation properties to $Ca^{2+}$ of the latex is not specifically limited, but is preferably set within a temperature range where the film forming treatment is conducted by the anode coagulation method. In general, liquid temperature of the aqueous solution is preferably set to about 25° C. in case of evaluating the degree of coagulation properties to the concentration of $Ca^{2+}$. In the present invention, the liquid temperature of the aqueous solution having a predetermined concentration of $Ca^{2+}$ was set to 25° C., unless otherwise specified.

In the proteolytic agent for natural rubber latex of the present invention, a ratio of the content of the surfactant H to the surfactant L is preferably within a range from 15:85 to 70:30 in a weight ratio.

The use of the surfactant H and the surfactant L in a weight ratio within a range from 15:85 to 70:30 makes it possible to easily control the degree of the coagulation properties to the $Ca^{2+}$ of the surfactant. Accordingly, it is made possible to improve balance between the film forming properties by means of the anode coagulation method and the storage stability of the latex itself with respect to the proteolyzed natural rubber latex (or deproteinized natural rubber latex) treated with the proteolytic agent of the present invention.

Embodiments of the present invention will now be described.

[Deproteinized natural rubber latex and method of preparing the same]

(Natural Rubber Latex)

The natural rubber latex used to prepare the deproteinized natural rubber latex of the present invention may be any of a field latex obtained as a rubber sap and an ammonia-retained concentrated latex.

(Protease)

In the present invention, the protease used in a treatment for decomposition of a protein to the natural rubber latex is not specifically limited and various conventionally known proteases can be used and, for example, an alkaline protease is preferable. The protease may be derived from any of bacteria, filamentous bacteria and yeast, and the protease is preferably derived from bacteria, particularly preferably from the genus Bacillus. It is also possible to use enzymes such as lipase, esterase, amylase, lacase and cellulase in combination.

When using the alkaline protease, its activity [measured value obtained by modification of the Anson-hemoglobin method (Anson. M. L. J. Gen. Physiol., 22, 79 (1938))] is within a range from 0.1 to 50 APU/g, and preferably within a range from 1 to 25 APU/g.

The amount of the protease varies depending on the activity of the protease itself, and is not specifically limited. In general, the content of the protease is preferably controlled within a range from 0.0001 to 20 parts by weight, and more preferably within a range from 0.001 to 10 parts by weight, based on 100 parts by weight of the rubber component in the natural rubber latex. When the content of the protease is within the range described above, a protein in the latex can be sufficiently decomposed while maintaining the activity of the protease. Alternatively, the effect corresponding to the amount of the protease can be exerted effectively and, therefore, it is advantageous in view of the cost.

(Surfactant)

The surfactant used to prepare the deproteinized natural rubber latex of the present invention is composed of a combination of two or more surfactants having different coagulation properties to $Ca^{2+}$. It is required for the combination of two or more surfactants to be set so that the coagulation properties to $Ca^{2+}$ with respect to the aqueous solution containing two or more surfactants are within a predetermined range.

Specifically, it is required that, when a liquid temperature of an aqueous solution (or aqueous dispersion medium) containing two or more surfactants is 25° C. and the concentration of $Ca^{2+}$ is 0.1 mol/L or less, the surfactants are stably dispersed, whereas, when the liquid temperature of the aqueous solution (or aqueous dispersion medium) is 25° C. and the concentration of $Ca^{2+}$ is 1.0 mol/L or more, the surfactants are coagulated.

As the surfactant used in the present invention, for example, at least one surfactant H selected from the group consisting of carboxylic acid anionic surfactant, higher alcohol sulfate ester salt anionic surfactant, sulfonic acid anionic surfactant and phosphoric acid anionic surfactant, and at least one surfactant L selected from the group consisting of higher alkyl phenyl ether sulfate ester salt anionic surfactant and higher alkyl ether sulfate ester salt anionic surfactant may be used in combination.

Those included in the group of the surfactant H are surfactants having relatively high coagulation properties (relatively low dispersibility) to $Ca^{2+}$, and those included in the group of the surfactant L are surfactants having relatively low coagulation properties (relatively high dispersibility) to $Ca^{2+}$.

Specific examples of those included in the group of the surfactant H are shown in Table 1. Also, specific examples of those included in the group of the surfactant L are shown in Table 2.

TABLE 1

*Surfactant H (having high coagulation properties to $Ca^{2+}$)

| No. | Kind and name of surfactants |
|---|---|
| H-1 | Carboxylic acid anionic surfactant |
| H-1-1 | Potassium oleate |
| H-1-2 | Sodium dialkylsuccinate |
| H-1-3 | Sodium oleate |
| H-1-4 | Sodium laurate |
| H-1-5 | Sodium stearate |
| H-2 | Higher alcohol sulfate ester salt anionic surfactant |
| H-2-1 | Sodium laurate sulfate |
| H-2-2 | Sodium cetyl sulfate |
| H-2-3 | sodium stearyl sulfate |
| H-2-4 | Sodium oleyl sulfate |
| H-3 | Sulfonic acid anionic surfactant |
| H-3-1 | Sodium dodecylbenzene sulfonate |
| H-4 | Phosphoric acid anionic surfactant |
| H-4-1 | Potassium polyoxyethylene nonylphenyl phosphate |

TABLE 2

*Surfactant L (having low coagulation properties to $Ca^{2+}$)

| No. | Kind and name of surfactants |
|---|---|
| L-1 | Higher alkyl phenyl ether sulfate ester anionic surfactant |
| L-1-1 | Sodium POE nonyl phenyl ether sulfate |
| L-2 | Higher alkyl ether sulfate ester salt anionic surfactant |
| L-2-1 | Sodium POE alkyl ether sulfate |

POE: polyoxyethylene

Although a mixing ratio of the surfactant H to the surfactant L is not specifically limited, a weight ratio (H:L) is preferably set within a range from 15:85 to 70:30.

When the total amount (total content) of the surfactant H and the surfactant L is equal to 100, the lower limit of the addition amount (content) of the surfactant H is preferably 20 [H:L (weight ratio)=20:80], and more preferably 25 [H:L (weight ratio)=25:75], within the range described above. On the other hand, the upper limit of the content of the surfactant H is preferably 65 [H:L (weight ratio) 65:35], and more preferably 60 [H:L (weight ratio) =60:40], within the range described above.

(Content of Protease and Surfactant)

In the present invention, especially second invention among the present invention, the content of the protease and that of the surfactant on treatment for removal of a protein are not specifically limited. To efficiently promote the treatment for decomposition of a protein, a ratio of the both is preferably set within a range from 1:1 to 1:200, and more preferably from 1:10 to 1:50.

(Method of Treatment for Decomposition and Removal of Protein)

The treatment for decomposition of a protein to a natural rubber latex is conducted by adding a predetermined amount of the protease and a predetermined combination of the surfactants to a natural rubber as a raw material and maturing the mixture for about several tens of minutes to one week, and preferably about 1 to 3 days.

This maturing treatment may be conducted while stirring the latex or allowing it to stand. If necessary, the temperature may be controlled. The temperature is preferably controlled within a range from 5 to 90° C., and more preferably from 20 to 60° C. to obtain sufficient activity of the enzyme. When the temperature is lower than 5° C., there is a fear that the enzyme reaction does not proceed. On the other hand, when the temperature exceeds 90° C., there is a fear that the enzyme is devitalized.

The treatment for removal of a protein (or decomposition product thereof) after the decomposition of a protein includes, but is not specifically limited to, a treatment of concentrating the latex by centrifugation or ultrafiltration and separating the non-rubber component transferred in water such as protein decomposition product and the rubber particles in the latex, or a treatment of separating the rubber particles by coagulation using an acid. Among these treatments, purification by centrifugation is most preferred in view of the accuracy and efficiency of purification.

The protease added to the natural rubber latex is washed and removed by the above purification treatment after being subjected to the treatment for removal of a protein. Regarding the surfactants added to the natural rubber latex, a portion of them is washed and removed by the purification treatment. Although a portion of the surfactants is remained in the deproteinized natural rubber latex even after the purification treatment and acts as a stabilizer of the latex, the stability of the deproteinized natural rubber latex is drastically impaired when the residual amount is too small (when almost all of them is removed by the purification treatment). However, when the treatment of washing (purification) of the latex after the deproteinization treatment is conducted by a conventional centrifugation method under conventional treatment conditions, that is, a washing (purification) treatment is conducted under the conditions where the protease and the decomposition product of the protein can be washed and removed, it is not necessary to add a new surfactant to the latex after the deproteinization treatment.

More specifically, in case the cleaning (purification) treatment is conducted by a centrifugation treatment, sufficient stability and heat-sensitive coagulation properties of the latex can be maintained by dispersing a cream component separated in the upper layer by centrifugation under the conditions of 5,000 to 14,000 rpm for about 1 to 60 minutes again in water having almost the same volume as that of the cream component even after the deproteinization treatment using the water-soluble polymer which is previously added before the deproteinization treatment.

In case of preparing a deproteinized natural rubber latex of the third invention among the present invention, it is necessary to sufficiently take notice of the amount of the surfactant used in the treatment for decomposition of a protein to the natural rubber latex. The reason is as follows. That is, when the surfactant remains in a coagulated rubber obtained by the deproteinization treatment, it is likely to exert an adverse influence on the anode coagulation properties (sensitivity to anode coagulant) of the deproteinized natural rubber latex. In case of the deproteinized natural rubber latex of the third invention, since the latex is prepared by dispersing the solid rubber component obtained by the deproteinization treatment in the aqueous solution containing a predetermined surfactant, any problem does not arise even if the rubber component is coagulated on deproteinization treatment. Accordingly, if the protein and decomposition product thereof can be sufficiently removed, the surfactant may not be added on deproteinization treatment.

(Degree of Deproteinization)

Although the degree of the deproteinization in the deproteinized natural rubber latex used in the present invention is not specifically limited, it is required to control so that the nitrogen content (N %) as determined by the Kjeldahl method after the deproteinization treatment is 0.1% or less, preferably 0.05% or less, and more preferably 0.02% or less, in order to make a final rubber product low-allergic. When the nitrogen content exceeds the above range, there is a fear that the occurrence of the allergic reaction cannot be sufficiently suppressed in use of a final rubber product because of insufficient degree of the deproteinization.

The degree of the deproteinization can also be confirmed by the presence or absence of adsorption and degree of adsorption on the basis of the protein by means of an infrared absorption spectrum. In the rubber treated by using the proteolytic agent of the present invention, an absorption at 3320 cm$^{-1}$ derived from short-chain peptide or amino acid may be observed. However, it is preferable that an absorption at 3280 cm$^{-1}$ derived from polymer peptide as a cause for allergy is small. It is more preferable that any absorption at 3280 cm$^{-1}$ is not observed.

[Rubber Product Using Deproteinized Natural Rubber Latex]

The rubber product using the deproteinized natural rubber latex of the present invention is obtained by dipping a dipping mold, the surface of which is coated with an anode coagulant previously, in the deproteinized natural rubber latex of the present invention to form a rubber film formed on the surface of the dipping mold, vulcanizing the rubber film, and removing the rubber film from the dipping mold.

Examples of the anode coagulant, with which the surface of the dipping mold is previously coated, include, but are not limited to, metal salts having an ionic value of 2 or more and organic alkylamine salts. Examples of the metal salt having an ionic value of 2 or more include calcium nitrate and calcium chloride. These anode coagulants are generally used in the form of an aqueous solution.

The concentration of the anode coagulant on film formation maybe set according to a conventional method and is not specifically limited, but is usually set within a range from 5 to 20% by weight, and preferably from 10 to 15% by weight. This concentration is within a range from about 0.3 to 1.2 mol/L, and preferably from about 0.6 to 0.9 mol/L, when reduced based on the concentration of $Ca^{2+}$ assuming that the anode coagulant is calcium nitrate (molecular weight: 164).

The dipping mold used in the production of the rubber product varies depending on the shape of the objective rubber product. For example, when the rubber product is a rubber glove, a conventionally known hand mold may be used as the dipping mold.

The film forming conditions may be set by a conventional method according to the kind of the objective rubber product and the thickness of the rubber film.

Vulcanizing agents are previously added to the deproteinized natural rubber latex used in the production of the rubber products described above. If necessary, various additives, for example, vulcanization chemicals such as vulcanization accelerators, auxiliary vulcanization accelerators and vulcanization retardants, and various additives such as fillers can be incorporated.

Examples of the vulcanizing agent include sulfur, and organic sulfur-containing compounds such as trimethylthiourea and N,N'-diethylthiourea, and these vulcanizing agents can be used alone or in combination. The amount of the vulcanizing agent is decided by even balance between the vulcanization degree and the amount of the vulcanization accelerator, but is usually set within a range from 0.1 to 5 parts by weight, and preferably from 0.5 to 2 parts by weight, based on 100 parts by weight of the rubber solid content in the rubber latex.

Examples of the vulcanization accelerator include zinc N-ethyl-N-phenyldithiocarbamate (PX), zinc dimethyldithiocarbamate (PZ), zinc diethyldithiocarbamate (EZ), zinc dibutyldithiocarbamate (BZ), zinc salt of 2-mercaptobenzothiazole (MZ) and tetramethylthiuram disulfide (TT). These vulcanization accelerators can be used alone or in combination. The amount of the vulcanization accelerator is preferably set within a range from about 0.5 to 3 parts by weight based on 100 parts by weight of the rubber solid content in the rubber latex. Examples of the auxiliary vulcanization accelerator include zinc white. The amount of the auxiliary vulcanization accelerator is preferably set within a range from about 0.5 to 3 parts by weight based on 100 parts by weight of the rubber solid content in the rubber latex.

Examples of the filler include kaolin clay, hard clay and calcium carbonate. The amount of the filler is preferably 10 parts by weight or less based on 100 parts by weight of the rubber solid content in the rubber latex.

It is not necessary to incorporate a specific heat sensitizer and a specific anode coagulant into the deproteinized natural rubber latex in a larger amount as compared with a conventional formulation, like the deproteinized natural rubber latex described Japanese Published Unexamined Patent (Kokai Tokkyo Koho) No. 2000-17002. Therefore, according to the rubber product using the deproteinized natural rubber latex of the present invention, it is made possible to prepare a high-quality rubber product, which is less contaminated with impurities, while reducing the material cost.

EXAMPLES

The following Examples and Comparative Examples further illustrate the present invention.

Example 1

(1) Preparation of Deproteinized Natural Rubber Latex

A high ammonia latex of a natural rubber was diluted so that the concentration of the rubber component becomes 30% by weight. A deproteinizing agent comprising a protease and a surfactant was added in the amount of 1% by weight based on the rubber content of the latex. Then, the mixture was matured by standing while maintaining the liquid temperature at 30° C. for 24 hours, thereby subjecting to a treatment for decomposition of a protein.

As the deproteinizing agent, a mixture of 2 parts by weight of a protease [alkali protease, manufactured by Novo-Nordisk Bioindustri A/S under the trade name of "Alcalase 2.0M"], 49 parts by weight of potassium oleate [surfactant H (No. H-1-1) shown in Table 1] and 49 parts by weight of sodium polyoxyethylene nonyl phenyl ether sulfate [surfactant L (No. L-1-1) shown in Table 2] was used.

After the completion of the treatment for decomposition of a protein, the latex was subjected to a centrifugation treatment at 13,000 rpm for 30 minutes and the cream component separated in the upper layer was dispersed again in water having the same volume as that of the cream component to obtain a deproteinized natural rubber latex.

(2) Formation of Rubber Film (Production of Rubber Glove)

Based on 100 parts by weight of the rubber solid content in the deproteinized natural rubber latex, 1 part by weight of colloidal sulfur dispersed in water, 0.5 parts by weight of zinc white and 1 part by weight of a vulcanization accelerator (zinc dibutyldithiocarbamate (BZ), manufactured by OUCHISHINKO CHEMICAL INDUSTRIAL CO., LTD. under the trade name of "NOCCELER Bz") were added, followed by maturing (pre-vulcanization) at 40° C. for 24 hours.

After previously coating the surface of a glass dipping mold (hand mold) with an aqueous 15 wt % solution of calcium nitrate (anode coagulant), this mold was dipped in the vulcanized latex for 10 seconds to form a rubber film on the surface of the mold.

After forming the rubber film, the mold drawn up from the vulcanized latex was allowed to stand at room temperature (about 25° C.) for 60 seconds and dipped again (double dipping) in the vulcanized latex for 10 seconds.

Furthermore, the rubber film formed on the surface of the mold was vulcanized by heating to 100° C. and the rubber film was removed from the dipping mold to obtain a rubber product (rubber glove).

Example 2

In the same manner as in Example 1, except that a mixture of 2 parts by weight of an alkali protease, 24 parts by weight of potassium oleate [surfactant H (No. H-1-1) and 74 parts by weight of sodium polyoxyethylene nonyl phenyl ether sulfate [surfactant L (No. L-1-1)] was used as the deproteinizing agent, "(1) Preparation of deproteinized natural rubber latex" and "(2) Formation of rubber film" were conducted.

Example 3

In the same manner as in Example 1, except that sodium lauryl sulfate [surfactant H (No. H-2-1) shown in Table 1] was used as the surfactant H in place of potassium oleate, "(1) Preparation of deproteinized natural rubber latex" and "(2) Formation of rubber film" were conducted.

Example 4

In the same manner as in Example 1, except that a mixture of 2 parts by weight of an alkali protease, 24 parts by weight of sodium lauryl sulfate [surfactant H (No. H-2-1) and 74 parts by weight of sodium polyoxyethylene alkyl ether sulfate [surfactant L (No. L-1-2) shown in Table 2] was used as the deproteinizing agent, "(1) Preparation of deproteinized natural rubber latex" and "(2) Formation of rubber film" were conducted.

Example 5

In the same manner as in Example 1, except that 2 parts by weight of an alkali protease, 49 parts by weight of sodium lauryl sulfate [surfactant H (No. H-2-1) and sodium polyoxyethylene alkyl ether sulfate [surfactant L (No. L-1-2)] were used as the deproteinizing agent, "(1) Preparation of deproteinized natural rubber latex" and "(2) Formation of rubber film" were conducted.

Comparative Example 1

In the same manner as in Example 1, except that 2 parts by weight of an alkali protease and 98 parts by weight of potassium oleate [surfactant H (No. H-1-1) were used as the deproteinizing agent (that is, the surfactant H was used alone), "(1) Preparation of deproteinized natural rubber latex" and "(2) Formation of rubber film" were conducted.

Comparative Example 2

In the same manner as in Example 1, except that 2 parts by weight of an alkali protease and 98 parts by weight of sodium polyoxyethylene nonyl phenyl ether sulfate [surfactant L (No. L-1-1) were used as the deproteinizing agent (that is, the surfactant L was used alone), "(1) Preparation of deproteinized natural rubber latex" and "(2) Formation of rubber film" were conducted.

Comparative Example 3

In the same manner as in Example 1, except that a mixture of 2 parts by weight of an alkali protease, 74 parts by weight of potassium oleate [surfactant H (No. H-1-1) and 24 parts by weight of sodium polyoxyethylene nonyl phenyl ether sulfate [surfactant L (No. L-1-1)] was used as the deproteinizing agent, "(1) Preparation of deproteinized natural rubber latex" and "(2) Formation of rubber film" were conducted.

Comparative Example 4

In the same manner as in Example 1, except that a mixture of 2 parts by weight of an alkali protease, 12 parts by weight of potassium oleate [surfactant H (No. H-1-1) and 86 parts by weight of sodium polyoxyethylene nonyl phenyl ether sulfate [surfactant L (No. L-1-1)] was used as the proteolytic agent, "(1) Preparation of deproteinized natural rubber latex" and "(2) Formation of rubber film" were conducted.

(Evaluation of Coagulation Properties to $Ca^{2+}$)

(i) With respect to the surfactant used in the treatment for decomposition of a protein in Examples 1 to 5 and Comparative Examples 1 to 4, the coagulation properties to $Ca^{2+}$ were evaluated. Evaluation was conducted in the following procedure. That is, the surfactant used in the treatment for decomposition of a protein was dissolved in water in the same content as that in the deproteinizing agent, thereby to control the concentration to 10% by weight, and then an aqueous solution of the surfactant was added dropwise in an aqueous solution (25° C.) containing $Ca^{2+}$. The concentration of $Ca^{2+}$ measured includes 0.1 mol/L and 1.0 mol/L. The evaluation results are as shown in Table 3.

Each content of the surfactant shown in Table 3 is an approximate value which shows the content of the surfactant in the deproteinizing agent shown in Table 4.

(ii) With respect to the deproteinized natural rubber latexes obtained in Examples 1 to 5 and Comparative Examples 1 to 4, the coagulation properties to $Ca^{2+}$ were evaluated. Evaluation was conducted in the following procedure. That is, the concentration of the rubber solid content in the deproteinized natural rubber latex was controlled to 60% by weight, and then the latex was added dropwise in an aqueous solution (25° C.) containing $Ca^{2+}$. The concentration of $Ca^{2+}$ measured includes 0.01 mol/L and 0.1 mol/L. The evaluation results are as shown in Table 4.

(Measurement of Nitrogen Content)

With respect to the deproteinized natural rubber latexes obtained in Examples 1 to 5 and Comparative Examples 1 to 4, the nitrogen content (N %) was measured by the Kjeldahl method. The measurement results are as shown in the column of "N %" in Table 4.

(Evaluation of Physical Properties of Vulcanized Rubber Film)

With respect to the rubber products (rubber products) obtained in the Examples 1 to 5 and Comparative Examples 1 to 4, the thickness and uniformity of the rubber film were evaluated. In accordance with the test procedure defined in JIS K 6301, the tensile strength $T_B$ (MPa) and the elongation at break $E_B$ (%) were determined. The measurement results are as shown in Table 5.

TABLE 3

*Surfactant used in treatment for decomposition of protein

| | Content | | Coagulation properties to Ca²⁺ | |
|---|---|---|---|---|
| | | of surfactant | 0.1 mol/L | 1.0 mol/L |
| Example 1 | H-1-1 | 50% | dispersed | coagulated |
| | L-1-1 | 50% | | |
| Example 2 | H-1-1 | 24.5% | dispersed | coagulated |
| | L-1-1 | 75.5% | | |
| Example 3 | H-2-1 | 50% | dispersed | coagulated |
| | L-1-1 | 50% | | |
| Example 4 | H-2-1 | 24.5% | dispersed | coagulated |
| | L-1-2 | 75.5% | | |
| Example 5 | H-2-1 | 50% | dispersed | coagulated |
| | L-1-2 | 50% | | |
| Comp. Example 1 | H-1-1 | 100% | coagulated | coagulated |
| Comp. Example 2 | L-1-1 | 100% | dispersed | dispersed |
| Comp. Example 3 | H-1-1 | 75.5% | coagulated | coagulated |
| | L-1-1 | 24.5% | | |
| Comp. Example 4 | H-1-1 | 12.2% | dispersed | dispersed |
| | L-1-1 | 87.8% | | |

(Note)
Both symbols "H-" and "L-" in the column of "Content of surfactant" denote surfactants described in Table 1 and Table 2.

TABLE 4

| | Content of each component of deproteinizing agent (weight ratio) | | Characteristics of deproteinized natural rubber latex | | |
|---|---|---|---|---|---|
| | | | N% | Coagulation properties to Ca²⁺ | |
| | | | | 0.01 mol/L | 0.1 mol/L |
| Example 1 | Protease | 2 | 0.019 | non-coagulated | coagulated |
| | H-1-1 | 49 | | | |
| | L-1-1 | 49 | | | |
| Example 2 | Protease | 2 | 0.021 | non-coagulated | coagulated |
| | H-1-1 | 24 | | | |
| | L-1-1 | 74 | | | |
| Example 3 | Protease | 2 | 0.018 | non-coagulated | coagulated |
| | H-2-1 | 49 | | | |
| | L-1-1 | 49 | | | |
| Example 4 | Protease | 2 | 0.019 | non-coagulated | coagulated |
| | H-2-1 | 24 | | | |
| | L-1-2 | 74 | | | |
| Example 5 | Protease | 2 | 0.020 | non-coagulated | coagulated |
| | H-2-1 | 49 | | | |
| | L-1-2 | 49 | | | |
| Comp. Example 1 | Protease | 2 | 0.019 | coagulated | coagulated |
| | H-1-1 | 98 | | | |
| Comp. Example 2 | Protease | 2 | 0.020 | non-coagulated | non-coagulated |
| | L-1-1 | 98 | | | |
| Comp. Example 3 | Protease | 2 | 0.020 | coagulated | coagulated |
| | H-1-1 | 74 | | | |
| | L-1-1 | 24 | | | |
| Comp. Example 4 | Protease | 2 | 0.019 | non-coagulated | non-coagulated |
| | H-1-1 | 12 | | | |
| | L-1-1 | 86 | | | |

(Note) Both symbols "H-" and "L-" in the column of "Content of each component of deproteinizing agent" denote surfactants described in Table 1 and Table 2.

TABLE 5

| | Properties of vulcanized rubber film | | | |
|---|---|---|---|---|
| | Film thickness (mm) | Film uniformity | Tensile strength $T_B$ (MPa) | Elongation at break $E_B$ (%) |
| Example 1 | 0.38 | good | 27.4 | 960 |
| Example 2 | 0.37 | good | 27.1 | 950 |
| Example 3 | 0.37 | good | 26.8 | 950 |
| Example 4 | 0.37 | good | 27.7 | 970 |
| Example 5 | 0.38 | good | 26.8 | 950 |
| Comp. Example 1 | 0.40 | poor | 27.8 | 980 |
| Comp. Example 2 | 0.32 | poor | 27.1 | 960 |
| Comp. Example 3 | 0.39 | poor | 27.1 | 940 |
| Comp. Example 4 | 0.33 | poor | 27.3 | 950 |

As is apparent from Table 3 to Table 5, regarding all deproteinized natural rubber latexes obtained in Examples 1 to 5, that is, the deproteinized natural rubber latexes obtained by subjecting to the treatment for decomposition of a protein using the surfactant H having relatively high coagulation properties to Ca²⁺ in combination with the surfactant L having relatively low coagulation properties to Ca²⁺, a rubber component was not coagulated when the concentration of calcium ions (Ca²⁺) is 0.01 mol/L or less and the rubber component was coagulated when the concentration of Ca²⁺ is 0.1 mol/L or more.

Therefore, it has been found that the deproteinized natural rubber latexes obtained in Examples 1 to 5 are suited to form a film by the anode coagulation method and are capable of conducting film formation of a rubber product having a sufficient film thickness by the anode coagulation method, as is apparent from the results of "film thickness" and "film uniformity".

To the contrary, in case Comparative Example 1 wherein only the surfactant H was used and Comparative Example 3 wherein the content of the surfactant H was extremely large, since the rubber component was coagulated when the concentration of Ca²⁺ is 0.01 mol/L or less, sufficient film formation could not conducted, thereby causing a problem such as poor uniformity of the film.

In case Comparative Example 2 wherein only the surfactant L was used and Comparative Example 4 wherein the content of the surfactant L was extremely larger than that of the surfactant H, since the rubber component was not coagulated even when the concentration of Ca²⁺ is 0.1 mol/L or more, sufficient film formation could not conducted, thereby causing such a problem that a film having a sufficient film thickness can not be uniformly formed.

Example 6

(1) Preparation of Deproteinized Natural Rubber Latex

A high ammonia latex of a natural rubber was diluted so that the concentration of the rubber component becomes 30% by weight. A proteolytic agent comprising a protease and a surfactant was added in the amount of 1% by weight based on the rubber content of the latex. Then, the mixture was matured by standing while maintaining the liquid temperature at 30° C. for 24 hours, thereby subjecting to a treatment for decomposition of a protein.

As the proteolytic agent, a mixture of 2 parts by weight of a protease [alkali protease, manufactured by Novo-Nordisk Bioindustri A/S under the trade name of "Alcalase 2.0M"], 49 parts by weight of potassium oleate [surfactant H (No. H-1-1) shown in Table 1] and 49 parts by weight of sodium polyoxyethylene nonyl phenyl ether sulfate [surfactant L (No. L-1-1) shown in Table 2] was used.

After the completion of the treatment for decomposition of a protein, the latex was subjected to a centrifugation treatment at 13,000 rpm for 30 minutes and the cream component separated in the upper layer was dispersed again in water having the same volume as that of the cream component to obtain a deproteinized natural rubber latex.

(2) Formation of Rubber Film

Based on 100 parts by weight of the rubber solid content in the deproteinized natural rubber latex, 1 part by weight of colloidal sulfur dispersed in water, 0.5 parts by weight of zinc white and 1 part by weight of a vulcanization accelerator (zinc dibutyldithiocarbamate (BZ), manufactured by OUCHISHINKO CHEMICAL INDUSTRIAL CO., LTD. under the trade name of "NOCCELER Bz") were added, followed by maturing (pre-vulcanization) at 40° C. for 24 hours.

After previously coating the surface of a glass dipping mold (hand mold) with an aqueous 15 wt % solution of calcium nitrate (anode coagulant), this mold was dipped in the vulcanized latex for 10 seconds to form a rubber film on the surface of the mold.

After forming the rubber film, the mold drawn up from the vulcanized latex was allowed to stand at room temperature (about 25° C.) for 60 seconds and dipped again (double dipping) in the vulcanized latex for 10 seconds.

Furthermore, the rubber film formed on the surface of the mold was vulcanized by heating to 100° C. and the rubber film was removed from the dipping mold to obtain a rubber product.

Example 7

In the same manner as in Example 6, except that a mixture of 2 parts by weight of an alkali protease, 24 parts by weight of potassium oleate [surfactant H (No. H-1-1) and 74 parts by weight of sodium polyoxyethylene nonyl phenyl ether sulfate [surfactant L (No. L-1-1)] was used as the proteolytic agent, "(1) Preparation of deproteinized natural rubber latex" and "(2) Formation of rubber film" were conducted.

Example 8

In the same manner as in Example 6, except that sodium lauryl sulfate [surfactant H (No. H-2-1) shown in Table 1] was used as the surfactant H in place of potassium oleate, "(1) Preparation of deproteinized natural rubber latex" and "(2) Formation of rubber film" were conducted.

Example 9

(1) Preparation of Deproteinized Natural Rubber Latex

The same amount of the proteolytic agent as that used in Example 6 was added to a high ammonia latex of a natural rubber diluted so that the concentration of the rubber component becomes 30% by weight and the treatment for decomposition of a protein was conducted under the same conditions.

After the completion of the treatment, the resulting proteolyzed natural rubber latex was used as it is without subjecting to the treatment for removal of a decomposition product due to a centrifugation treatment.

(2) Formation of Rubber Film and Evaluation of Film Forming Properties and Physical Properties In the same manner as in Example 6, except that the proteolyzed natural rubber latex was used in place of the deproteinized natural rubber latex, "(2) Formation of rubber film" was conducted.

Example 10

In the same manner as in Example 9, except that a mixture (which is the same proteolytic agent as that of Example 7) of 2 parts by weight of an alkali protease, 24 parts by weight of potassium oleate [surfactant H (No. H-1-1) and 74 parts by weight of sodium polyoxyethylene nonyl phenyl ether sulfate [surfactant L (No. L-1-1)] was used as the proteolytic agent, "(1) Preparation of deproteinized natural rubber latex" and "(2) Formation of rubber film" were conducted.

Example 11

In the same manner as in Example 9, except that a mixture (which is the same proteolytic agent as that of Example 8) of 2 parts by weight of an alkali protease, 24 parts by weight of sodium lauryl sulfate [surfactant H (No. H-2-1) and 74 parts by weight of sodium polyoxyethylene nonyl phenyl ether sulfate [surfactant L (No. L-1-1)] was used as the proteolytic agent, "(1) Preparation of deproteinized natural rubber latex" and "(2) Formation of rubber film" were conducted.

Comparative Example 5

In the same manner as in Example 6, except that 2 parts by weight of an alkali protease and 98 parts by weight of potassium oleate [surfactant H (No. H-1-1) were used as the proteolytic agent (that is, the surfactant H was used alone), "(1) Preparation of deproteinized natural rubber latex" and "(2) Formation of rubber film" were conducted.

Comparative Example 6

In the same manner as in Example 6, except that 2 parts by weight of an alkali protease and 98 parts by weight of sodium polyoxyethylene nonyl phenyl ether sulfate [surfactant L (No. L-1-1) were used as the proteolytic agent (that is, the surfactant L was used alone), "(1) Preparation of deproteinized natural rubber latex" and "(2) Formation of rubber film" were conducted.

Comparative Example 7

In the same manner as in Example 6, except that a mixture of 2 parts by weight of an alkali protease, 74 parts by weight of potassium oleate [surfactant H (No. H-1-1) and 24 parts by weight of sodium polyoxyethylene nonyl phenyl ether sulfate [surfactant L (No. L-1-1)] was used as the proteolytic agent, "(1) Preparation of deproteinized natural rubber latex" and "(2) Formation of rubber film" were conducted.

Comparative Example 8

In the same manner as in Example 6, except that a mixture of 2 parts by weight of an alkali protease, 12 parts by weight of potassium oleate [surfactant H (No. H-1-1) and 86 parts by weight of sodium polyoxyethylene nonyl phenyl ether sulfate [surfactant L (No. L-1-1)] was used as the proteolytic agent, "(1) Preparation of deproteinized natural rubber latex" and "(2) Formation of rubber film" were conducted.

Comparative Example 9

In the same manner as in Example 9, except that a mixture (which is the same proteolytic agent as that of Comparative Example 5) of 2 parts by weight of an alkali protease and 98 parts by weight of potassium oleate [surfactant H (No. H-1-1) was used as the proteolytic agent, "(1) Preparation of deproteinized natural rubber latex" and "(2) Formation of rubber film" were conducted.

Comparative Example 10

In the same manner as in Example 9, except that a mixture (which is the same proteolytic agent as that of Comparative Example 6) of 2 parts by weight of an alkali protease and 98 parts by weight of sodium polyoxyethylene nonyl phenyl ether sulfate [surfactant H (No. L-1-1) was used as the proteolytic agent, "(1) Preparation of deproteinized natural rubber latex" and "(2) Formation of rubber film" were conducted.

Comparative Example 11

In the same manner as in Example 9, except that a mixture (which is the same proteolytic agent as that of Comparative Example 7) of 2 parts by weight of an alkali protease, 74 parts by weight of potassium oleate [surfactant H (No. H-1-1) and 24 parts by weight of sodium polyoxyethylene nonyl phenyl ether sulfate [surfactant H (No. L-1-1) was used as the proteolytic agent, "(1) Preparation of deproteinized natural rubber latex" and "(2) Formation of rubber film" were conducted.

Comparative Example 12

In the same manner as in Example 9, except that a mixture (which is the same proteolytic agent as that of Comparative Example 8) of 2 parts by weight of an alkali protease, 12 parts by weight of potassium oleate [surfactant H (No. H-1-1) and 86 parts by weight of sodium polyoxyethylene nonyl phenyl ether sulfate [surfactant H (No. L-1-1) was used as the proteolytic agent, "(1) Preparation of deproteinized natural rubber latex" and "(2) Formation of rubber film" were conducted.

(Evaluation of Coagulation Properties to $Ca^{2+}$)

(i) With respect to the surfactant used in the treatment for decomposition of a protein in Examples 6 to 11 and Comparative Examples 5 to 12, the coagulation properties to $Ca^{2+}$ with respect to the surfactant contained in the proteolytic agent were evaluated. Evaluation was conducted in the following procedure. That is, the surfactant used in the treatment for decomposition of a protein was dissolved in water in the same content as that in the proteolytic agent, thereby to control the concentration to 10% by weight, and then an aqueous solution of the surfactant was added dropwise in an aqueous solution (25° C.) containing $Ca^{2+}$. The concentration of $Ca^{2+}$ measured includes 0.1 mol/L and 1.0 mol/L. The evaluation results are as shown in Table 6.

Each content of the surfactant shown in Table 6 is an approximate value which shows the content of the surfactant in the proteolytic agent shown in Table 7 and Table 8.

(ii) With respect to the deproteinized natural rubber latexes obtained in Examples 6 to 11 and Comparative Examples 5 to 12, the coagulation properties to $Ca^{2+}$ were evaluated. Evaluation was conducted in the following procedure. That is, the concentration of the rubber solid content in the deproteinized natural rubber latex was controlled to 60% by weight, and then the latex was added dropwise in an aqueous solution (25° C.) containing $Ca^{2+}$. The concentration of $Ca^{2+}$ measured includes 0.01 mol/L and 0.1 mol/L. The evaluation results are as shown in Table 7 and Table 8.

From a viewpoint of achievement of good balance between the film forming properties by means of the anode coagulation method and the dispersion stability of the latex itself, the coagulation properties to $Ca^{2+}$ with respect to the deproteinized natural rubber latex or proteolyzed natural rubber latex are preferably those wherein coagulation of a rubber component does not occur when the concentration of $Ca^{2+}$ is 0.01 mol/L or less and coagulation of the rubber component occurs when the concentration of $Ca^{2+}$ is 0.1 mol/L or more.

(Measurement of Nitrogen Content)

With respect to the deproteinized natural rubber latexes obtained in Examples 6 to 8 and Comparative Examples 5 to 8, the nitrogen content (N %) was measured by the Kjeldahl method. The measurement results are as shown in the column of "N %" in Table 7.

(Evaluation of Physical Properties of Vulcanized Rubber Film)

With respect to the rubber products obtained in the Examples 6 to 11 and Comparative Examples 5 to 12, the thickness and uniformity of the rubber film were evaluated. In accordance with the test procedure defined in JIS K 6301, the tensile strength $T_B$ (MPa) and the elongation at break $E_B$ (%) were determined. The measurement results are as shown in Table 9.

TABLE 6

*Surfactant used in treatment for decomposition of protein

| | | Content of surfactant | Coagulation properties to $Ca^{2+}$ | |
|---|---|---|---|---|
| | | | 0.1 mol/L | 1.0 mol/L |
| Example 6 & 9 | H-1-1 | 50% | dispersed | coagulated |
| | L-1-1 | 50% | | |
| Example 7 & 10 | H-1-1 | 24.5% | dispersed | coagulated |
| | L-1-1 | 75.5% | | |
| Example 8 & 11 | H-2-1 | 50% | dispersed | coagulated |
| | L-1-1 | 50% | | |
| Comp. Example 5 & 9 | H-1-1 | 100% | coagulated | coagulated |
| Comp. Example 2 & 10 | L-1-1 | 100% | dispersed | dispersed |
| Comp. Example 7 & 11 | H-1-1 | 75.5% | coagulated | coagulated |
| | L-1-1 | 24.5% | | |
| Comp. Example 8 & 12 | H-1-1 | 12.2% | dispersed | dispersed |
| | L-1-1 | 87.8% | | |

(Note)
Both symbols "H-" and "L-" in the column of "Content of surfactant" denote surfactants described in Table 1 and Table 2.

TABLE 7

| Content of each component of proteolytic agent (weight ratio) | | | Characteristics of deproteinized natural rubber latex | |
|---|---|---|---|---|
| | | | Coagulation properties to $Ca^{2+}$ | |
| | | N% | 0.01 mol/L | 0.1 mol/L |
| Example 6 | Protease | 2 | 0.019 non-coagulated | coagulated |
| | H-1-1 | 49 | | |
| | L-1-1 | 49 | | |
| Example 7 | Protease | 2 | 0.021 non-coagulated | coagulated |
| | H-1-1 | 24 | | |
| | L-1-1 | 74 | | |
| Example 8 | Protease | 2 | 0.018 non-coagulated | coagulated |
| | H-2-1 | 49 | | |
| | L-1-1 | 49 | | |
| Comp. Example 5 | Protease | 2 | 0.019 coagulated | coagulated |
| | H-1-1 | 98 | | |
| Comp. Example 6 | Protease | 2 | 0.020 non-coagulated | non-coagulated |
| | L-1-1 | 98 | | |
| Comp. | Protease | 2 | 0.020 coagulated | coagulated |

TABLE 7-continued

| | Content of each component of proteolytic agent | | Characteristics of deproteinized natural rubber latex | |
|---|---|---|---|---|
| | | | Coagulation properties to Ca²⁺ | |
| | (weight ratio) | N% | 0.01 mol/L | 0.1 mol/L |
| Example 7 | H-1-1 | 74 | | |
| | L-1-1 | 24 | | |
| Comp. Example 8 | Protease | 2 | 0.019 non-coagulated | non-coagulated |
| | H-1-1 | 12 | | |
| | L-1-1 | 86 | | |

(Note) Both symbols "H-" and "L-" in the column of "Content of each component of deproteinizing agent" denote surfactants described in Table 1 and Table 2.

TABLE 8

| | Content of each component of proteolytic agent | | Characteristics of deproteinized natural rubber latex | |
|---|---|---|---|---|
| | | | Coagulation properties to Ca²⁺ | |
| | (weight ratio) | N% | 0.01 mol/L | 0.1 mol/L |
| Example 9 | Protease | 2 | — non-coagulated | coagulated |
| | H-1-1 | 49 | | |
| | L-1-1 | 49 | | |
| Example 10 | Protease | 2 | — non-coagulated | coagulated |
| | H-1-1 | 24 | | |
| | L-1-1 | 74 | | |
| Example 11 | Protease | 2 | — non-coagulated | coagulated |
| | H-2-1 | 49 | | |
| | L-1-1 | 49 | | |
| Comp. Example 9 | Protease | 2 | — coagulated | coagulated |
| | H-1-1 | 98 | | |
| Comp. Example 10 | Protease | 2 | — non-coagulated | non-coagulated |
| | L-1-1 | 98 | | |
| Comp. Example 11 | Protease | 2 | — coagulated | coagulated |
| | H-1-1 | 74 | | |
| | L-1-1 | 24 | | |
| Comp. Example 12 | Protease | 2 | — non-coagulated | non-coagulated |
| | H-1-1 | 12 | | |
| | L-1-1 | 86 | | |

(Note) Both symbols "H-" and "L-" in the column of "Content of each component of deproteinizing agent" denote surfactants described in Table 1 and Table 2.

TABLE 9

| | Film thickness (mm) | Film uniformity | Tensile strength $T_B$ (MPa) | Elongation at break $E_B$ (%) |
|---|---|---|---|---|
| Example 6 | 0.38 | good | 27.4 | 960 |
| Example 7 | 0.37 | good | 27.1 | 950 |
| Example 8 | 0.37 | good | 26.8 | 950 |
| Comp. Example 5 | 0.40 | poor | 27.8 | 980 |
| Comp. Example 6 | 0.32 | poor | 27.1 | 960 |
| Comp. Example 7 | 0.39 | poor | 27.1 | 940 |
| Comp. Example 8 | 0.33 | poor | 27.3 | 950 |
| Example 9 | 0.38 | good | 26.5 | 920 |
| Example 10 | 0.37 | good | 25.7 | 930 |
| Example 11 | 0.37 | good | 25.8 | 930 |
| Comp. Example 9 | 0.38 | poor | 26.0 | 910 |
| Comp. Example 10 | 0.36 | poor | 24.1 | 960 |
| Comp. Example 11 | 0.39 | poor | 25.1 | 940 |
| Comp. Example 12 | 0.31 | poor | 24.3 | 920 |

As is apparent from Table 6 to Table 9, regarding all proteolyzed natural rubber latexes or deproteinized natural rubber latexes obtained by using the proteolytic agents of Examples 6 to 11 (using the surfactant H having relatively high coagulation properties to $Ca^{2+}$ in combination with the surfactant L having relatively low coagulation properties) to $Ca^{2+}$, coagulation did not occur when the concentration of $Ca^{2+}$ is 0.01 mol/L or less and coagulation occurred when the concentration of $Ca^{2+}$ is 0.1 mol/L or more.

Therefore, it has been found that the proteolytic agents of Examples 6 to 11 are suited to form a film by the anode coagulation method and are capable of conducting film formation of a rubber product having a sufficient film thickness by the anode coagulation method, as is apparent from the results of "film thickness" and "film uniformity".

To the contrary, in case Comparative Examples 1 and 5 wherein only the surfactant H was used and Comparative Examples 7 and 11 wherein the content of the surfactant H was extremely larger than that of the surfactant L, since the coagulation occurred when the concentration of $Ca^{2+}$ is 0.01 mol/L, sufficient film formation could not conducted, thereby causing a problem such as poor uniformity of the film.

In case Comparative Examples 6 and 10 wherein only the surfactant L was used and Comparative Examples 8 and 12 wherein the content of the surfactant L was extremely larger than that of the surfactant H, since coagulation did not occurred even when the concentration of $Ca^{2+}$ is 0.1 mol/L, sufficient film formation could not conducted, thereby causing such a problem that a film having a sufficient film thickness can not be uniformly formed.

What is claimed is:

1. A deproteinized natural rubber latex which is obtained by subjecting a natural rubber latex to a treatment for decomposition and removal of a protein, wherein the treatment for decomposition of a protein is conducted by adding a protease and two or more anionic surfactants having different coagulation properties to calcium ions ($Ca^{2+}$) to a natural rubber latex and maturing the natural rubber latex, and the two or more surfactants are stably dispersed when the concentration of $Ca^{2+}$ in an aqueous solution at 25° C. containing the surfactants is 0.1 mol/L or less, and are coagulated when the concentration of $Ca^{2+}$ in the aqueous solution is 1.0 mol/L or more.

2. The deproteinized natural rubber latex according to claim 1, wherein the deproteinized natural rubber latex, which is obtained by subjecting to a treatment for decomposition and removal of a protein, is prepared by adding a protease to a natural rubber latex and maturing the natural rubber latex, centrifuging the latex, thereby to isolate a creamy rubber solid content, and dispersing the rubber solid content in an aqueous medium, wherein the aqueous medium contains two or more anionic surfactants having different coagulation properties to calcium ions ($Ca^{2+}$), and enables the surfactants to stably disperse when a liquid temperature is 25° C. and the concentration of $Ca^{2+}$ is 0.1 mol/L or less, and to coagulate when the liquid temperature is 25° C. and the concentration of $Ca^{2+}$ is 1.0 mol/L or more.

3. The deproteinized natural rubber latex according to claim 1 or 2, wherein the two or more surfactants include:

at least one surfactant H selected from the group consisting of carboxylic acid anionic surfactant, higher alcohol sulfate ester salt anionic surfactant, sulfonic acid anionic surfactant and phosphoric acid anionic surfactant, and at least one surfactant L selected from the group consisting of higher alkyl phenyl ether sulfate ester salt anionic surfactant and higher alkyl ether sulfate ester salt anionic surfactant.

4. The deproteinized natural rubber latex according to claim 1, wherein the total amount of two or more surfactants added on treatment for decomposition of a protein is within a range from 0.01 to 10 parts by weight based on 100 parts by weight of the rubber solid content of the natural rubber latex.

5. The deproteinized natural rubber latex according to claim 2, wherein the total content of the two or more surfactants in the aqueous dispersion medium is within a range from 0.01 to 10 parts by weight based on 100 parts by weight of the rubber solid content dispersed in the aqueous dispersion medium.

6. A method of preparing a deproteinized natural rubber latex, which comprises adding a protease and two or more surfactants having different coagulation properties with respect to calcium ions ($Ca^{2+}$) to a natural rubber latex, and maturing the natural rubber latex, wherein the two or more anionic surfactants are stably dispersed when the concentration of $Ca^{2+}$ in an aqueous solution at 25° C. containing the surfactants is 0.1 mol/L or less, and are coagulated when the concentration of $Ca^{2+}$ in the aqueous solution at 25° C. is 1.0 mol/L or more.

7. A method of preparing a natural rubber latex, which comprises subjecting a natural rubber latex to a treatment for decomposition of a protein due to a protease and a treatment for removal of a protein due to centrifugation, and dispersing the resulting creamy rubber solid content in an aqueous medium, wherein the aqueous medium contains two or more anionic surfactants having different coagulation properties to $Ca^{2+}$ to a natural rubber latex, and enables the surfactants to stably disperse when a liquid temperature is 25° C. and the concentration of $Ca^{2+}$ is 0.1 mol/L or less, and to coagulate when the liquid temperature is 25° C. and the concentration of $Ca^{2+}$ is 1.0 mol/L or more.

8. A rubber product using a deproteinized natural rubber latex, which is obtained by dipping a dipping mold, the surface of which is coated with an anode coagulant, in the deproteinized natural rubber latex containing a vulcanizing agent added therein of claim 1, vulcanizing a rubber film formed on the surface of the dipping mold, and removing the rubber film from the dipping mold.

\* \* \* \* \*